(12) United States Patent
Chen et al.

(10) Patent No.: US 7,319,502 B2
(45) Date of Patent: Jan. 15, 2008

(54) IN-PLANE SWITCHING LIQUID CRYSTAL DISPLAY WITH WAVY ELECTRODES HAVING VARYING TROUGH LENGTHS

(75) Inventors: Chueh-Ju Chen, Miao-Li (TW); Chueh-Ju Yang, Miao-Li (TW)

(73) Assignee: Innolux Display Corp., Chu-Nan, Miao-Li County (TW)

( * ) Notice: Subject to any disclaimer, the term of this patent is extended or adjusted under 35 U.S.C. 154(b) by 297 days.

(21) Appl. No.: 11/131,031

(22) Filed: May 16, 2005

(65) Prior Publication Data
US 2005/0253989 A1     Nov. 17, 2005

(30) Foreign Application Priority Data
May 14, 2004     (TW) ................. 93113616 A

(51) Int. Cl.
*G02F 1/1343* (2006.01)
(52) U.S. Cl. ............................................. 349/141
(58) Field of Classification Search ............... 349/141
See application file for complete search history.

(56) References Cited

U.S. PATENT DOCUMENTS 6,621,102 B2 * 9/2003 Hirakata et al. ............. 257/72
2003/0123012 A1 * 7/2003 Yanagawa et al. .......... 349/141
2005/0128403 A1 * 6/2005 Liu .............................. 349/141

\* cited by examiner

*Primary Examiner*—Andrew Schechter
*Assistant Examiner*—Matthew Tynan
(74) *Attorney, Agent, or Firm*—Wei Te Chung

(57) ABSTRACT

A multi-domain IPS (in-plane switching) liquid crystal display (20) includes a first substrate (201), a second substrate (202), liquid crystal molecules (203) filled between the first and second substrates, and gate lines (211) and data lines (212) formed on the first substrate. The gate lines and data lines define pixel regions arranged in a matrix. Each pixel region includes pixel electrodes (233), common electrodes (243), and a TFT (thin film transistor) (220). The pixel electrodes and the common electrodes have a same curved shape with at least two different bend portions, and are uniformly spaced apart from each other. Therefore the electric field generated by them is a smooth continuum of multiple domains, and the visual performance at various different viewing angles is equally good. Because the pixel and common electrodes do not have sharp bends, disclination is avoided. Therefore the IPS liquid crystal display has a high contrast ratio.

10 Claims, 6 Drawing Sheets

IN-PLANE SWITCHING LIQUID CRYSTAL DISPLAY WITH WAVY ELECTRODES HAVING VARYING TROUGH LENGTHS

BACKGROUND OF THE INVENTION

1. Field of the Invention

The present invention relates to an IPS (in-plane switching) mode LCD (liquid crystal display), and the control of liquid crystal molecules therein.

2. General Background

Liquid crystal displays (LCDs) are typically used for information display in various devices such as computers and vehicle and airplane instrumentation. One type of LCD called the twisted nematic liquid crystal display (TN-LCD) often has the drawback of a narrow range of viewing angles. Thus, an improved design called the in plane switching liquid crystal display (IPS-LCD) has been developed in order to provide a broad range of viewing angles.

A conventional IPS mode LCD has an upper substrate, a lower substrate, and a liquid crystal layer interposed therebetween. The liquid crystal layer has a plurality of liquid crystal molecules. The liquid crystal molecules have a same orientation when not driven by an electric field, this orientation being parallel to the substrates. Pixel electrodes and common electrodes are disposed on the lower substrate. When a voltage is applied to the electrodes, an electric field is generated between the electrodes. The electric field drives the liquid crystal molecules to rotate, so that they have a new orientation that is still parallel to the substrates. The change in orientation results in a change in light transmission. In other words, the operation of the IPS mode LCD is such that the liquid crystal molecules rotate in a plane parallel with the substrates in order to fulfill optical switching. The displayed image has the important advantage of a wide viewing angle. In basic IPS mode LCDs, the pixel electrodes and common electrodes are each comb-shaped. The electric field of these LCDs in a driven state is along a certain direction. When the displayed image is viewed at different oblique angles, an observer can notice a quite large color shift.

Referring to FIG. 6, this is a cross-sectional view of components of a pixel area P of a typical IPS LCD. The pixel area P comprises a gate line 113 arranged in a first direction, a data line 115 and a common line 135 both arranged in a second direction orthogonal to the first direction, a TFT (thin film transistor) 120 positioned at an intersection of the data line 115 and the gate line 113, a pixel electrode 131, and a common electrode 133. The TFT 120 has a gate electrode 121, a source electrode 123 and a drain electrode 125, which are connected with the gate line 113, the data line 115 and the pixel electrode 131 respectively. The pixel electrode 131 and the common electrode 133 are spaced apart from each other. The pixel and common electrodes 131, 133 are each comb-shaped, with the teeth thereof being generally zigzagged. Portions of the teeth of the pixel and common electrodes 131, 133 that are parallel to each other in a third direction form a first sub-electrode group. Portions of the teeth of the pixel and common electrodes 131, 133 that are parallel to each other in a fourth direction form a second sub-electrode group.

When a voltage is applied, because the pixel and common electrodes 131, 133 have zigzagged structures, the electric field (not shown) generated is mainly along two directions. Turning to FIG. 7, the upper portion thereof shows part of the first sub-electrode group, and the lower portion thereof shows part of the second sub-electrode group. The liquid crystal molecules 130 in the upper and lower portions have different orientations, and the LCD exhibits a two-domain display effect. When viewing the LCD display from any oblique angle, the color shifts generated by the two domains counteract, and thus the overall color shift of the display is relatively small.

However, at junctions of the first and second sub-electrode groups, the electric field is abnormal, and the liquid crystal molecules 130 thereat cannot be driven properly. In other words, a disclination of the liquid crystal molecules 130 is generated at the elbows of the teeth of the pixel and common electrodes 131, 133. Light thereat cannot transmit properly, and the contrast ratio of the pixel area is lowered. Furthermore, the two-domain electrode configuration of the LCD inherently limits the display thereof. Equally good visual performance at various different viewing angles cannot be attained.

FIG. 8 shows the results of a simulation of the effect of driving voltage variations on display transmissivity for different rubbing angles formed between a rubbing direction of the liquid crystal molecules 130 and directions defined by the pixel and common electrodes 131, 133. At a larger rubbing angle, the liquid crystal molecules 130 can be driven at a lower threshold driving voltage, and the transmissivity decreases rapidly with an increase in the driving voltage. Therefore, it is necessary to have a precise driving voltage. That is, a precise manufacturing of the TFT 120, the data line 115 and the pixel electrode 131 is necessary. At a smaller rubbing angle, the transmissivity does not decrease with an increasing in the driving voltage. However, a higher threshold driving voltage is needed.

FIG. 9 shows the effect of viewing angle on contrast ratio of the typical IPS LCD described above. The IPS LCD has a largest contrast ratio at the horizontal axis and at the vertical axis. The viewing cone is generally cross-shaped. The contrast ratio is not uniform over different viewing angles.

What is needed, therefore, is an IPS-LCD which has fine viewing characteristics in different viewing directions.

SUMMARY

A multi-domain IPS (in-plane switching) liquid crystal display of a preferred embodiment of the present invention includes a first substrate, a second substrate, liquid crystal molecules filled between the first and second substrates, and gate lines and data lines formed on the first substrate. The gate lines and data lines define pixel regions arranged in a matrix. Each pixel region includes pixel electrodes, common electrodes, and a TFT (thin film transistor). The pixel electrodes and the common electrodes have a same curved shape with at least two different bend portions, and are uniformly spaced apart from each other. Therefore the electric field generated by them is a smooth continuum of multiple domains, and the visual performance at various different viewing angles is equally good. Because the pixel and common electrodes do not have sharp bends, disclination is avoided. Therefore the IPS liquid crystal display has a high contrast ratio.

Because the pixel and common electrodes have the curved shape, the electric field generated by them is a smooth continuum of multiple domains. Therefore the visual performance at various different viewing angles is equally good. Further, because the pixel and common electrodes do not have sharp bends, disclination manifest in the prior art is avoided. Therefore the IPS liquid crystal display has a high contrast ratio.

Other advantages and novel features will become more apparent from the following detailed description when taken in conjunction with the accompanying drawings, in which:

DETAILED DESCRIPTION OF PREFERRED EMBODIMENTS

Figure 1:
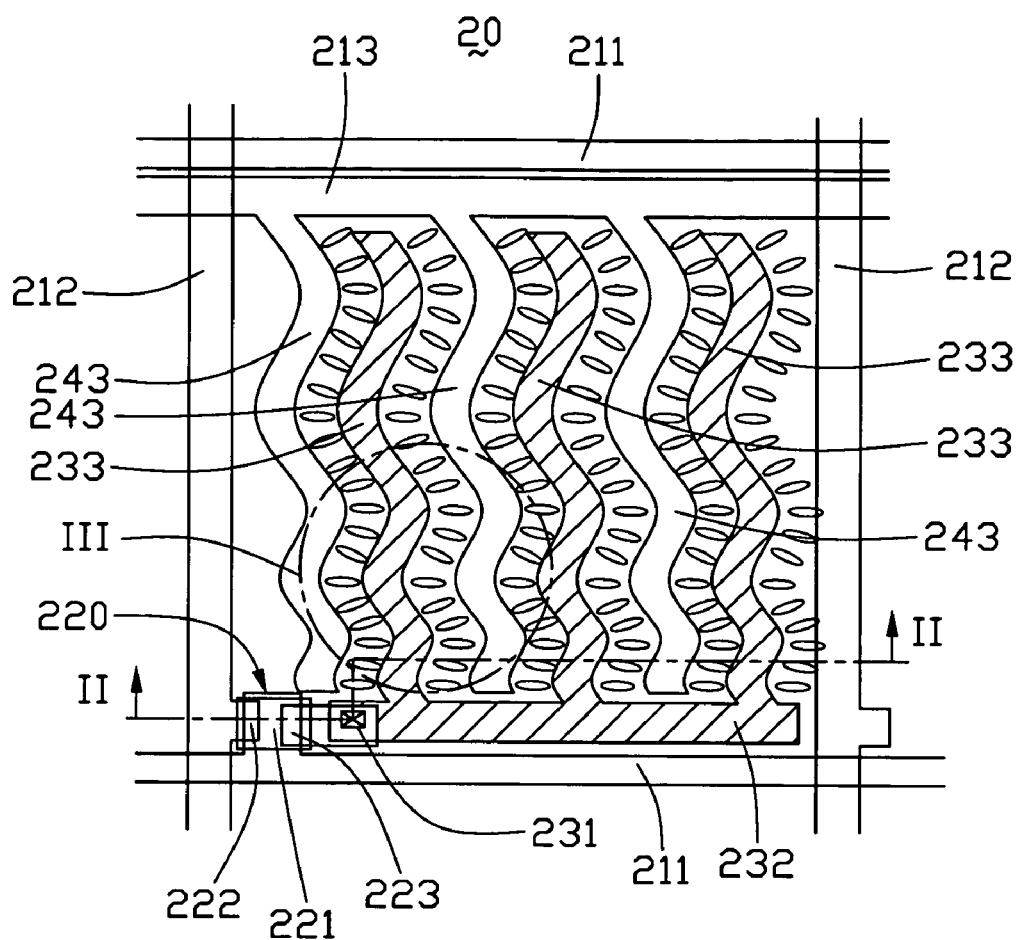
FIG. 1 is a schematic, top cross-sectional view of a pixel region of an IPS LCD according to a first embodiment of the present invention.
Figure 2:
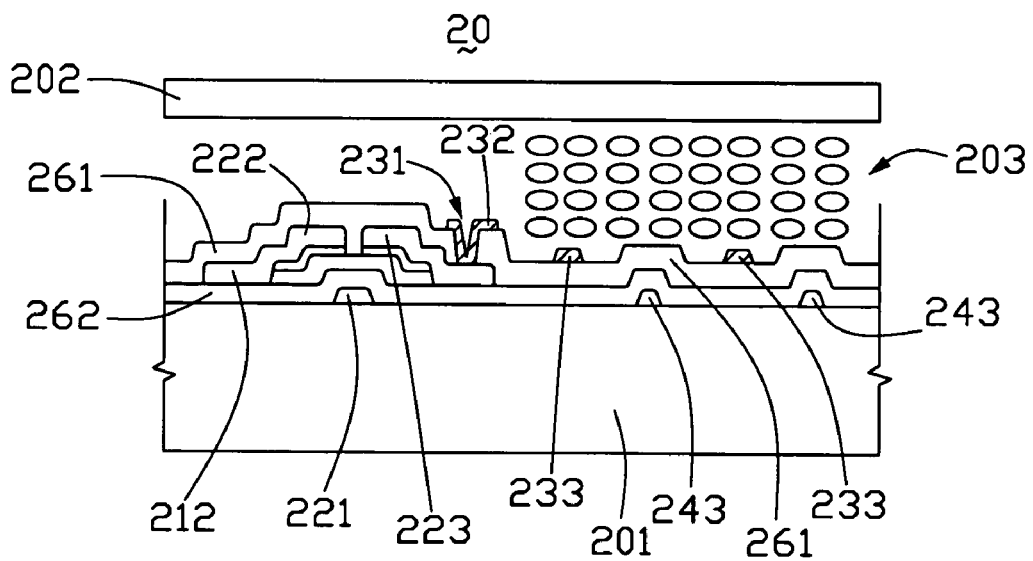
FIG. 2 is a schematic, abbreviated, side cross-sectional view of the IPS LCD of FIG. 1, taken along line II-II thereof.

Referring to FIG. 1 and FIG. 2, an in-plane switching liquid crystal display (IPS LCD) 20 according to the first embodiment of the present invention comprises a first substrate 201, a second substrate 202, positive liquid crystal molecules 203 interposed between the first and second substrates 201, 202, and a plurality of gate lines 211 and data lines 212 formed on the first substrate 201. The gate lines 211 and data lines 212 define a plurality of pixel regions arranged in a matrix.

Each pixel region comprises several common electrodes 243 and several pixel electrodes 233 that are disposed on different layers, a common electrode bus line 213, a pixel electrode bus line 232, a TFT (thin film transistor) 220, and a connection region 231. The TFT 220 has a gate electrode 221 connected to a gate line 211, a source electrode 222 connected to a data line 212, and a drain electrode 223 connected to the pixel electrode bus line 232 through the connection region 231. The pixel electrode bus line 232 is connected to the pixel electrodes 233. The common electrode bus line 213 is connected to the common electrodes 243. The pixel electrodes 233 and the common electrodes 243 have a same wavy shape, and are spaced a uniform distance apart from each other. The pixel electrodes 233 and common electrodes 243 can be made of a metallic material or a transparent conductive material such as ITO (indium tin oxide). The IPS LCD 20 has a higher aperture ratio if the electrodes 233, 243 are transparent.

Each pixel region further comprises a gate insulating layer 262 and a passivation layer 261. The gate insulating layer 262 is formed on the first substrate 201 to cover the gate and common electrodes 221 and 243. The passivation layer 261 is formed to cover the source, drain, and gate electrodes 222, 223, 221. The passivation layer 261 serves to protect the source, drain, and gate electrodes 222, 223, 221 from exterior humidity or contaminants.

Figure 3:
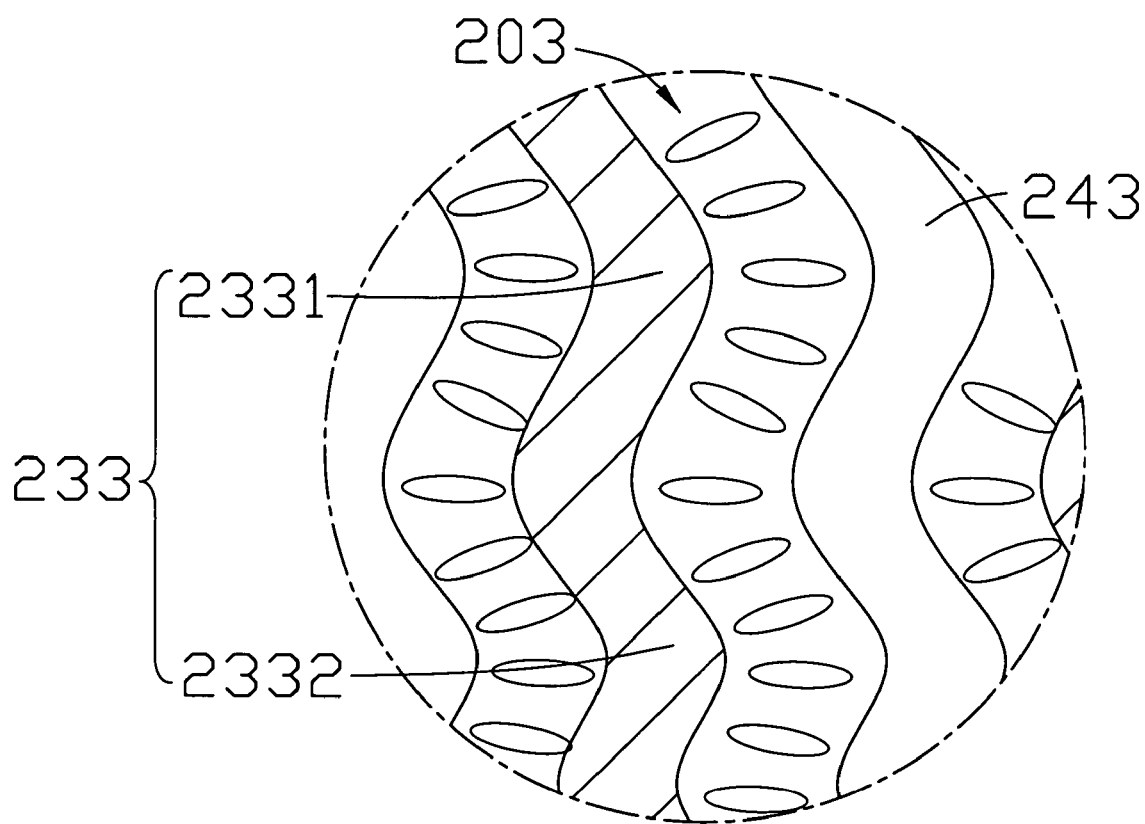
FIG. 3 is an enlarged view of a circled portion III of FIG. 1, showing approximate orientations of liquid crystal molecules between pixel and common electrodes when the IPS LCD is in a driven state.

FIG. 3 shows parts of the structures of the pixel electrodes 233 and the common electrodes 243, and the approximate orientation of liquid crystal molecules 203 when the IPS LCD 20 is in a driven state. Each pixel electrode 233, being wave-shaped, has a first bend portion 2331 and a second bend portion 2332 smoothly connecting with the first bend portion 2331. The first bend portion 2331 defines a first radius and has a first length, and the second bend portion 2332 defines a second radius and has a second length. The first radius is different from the second radius, and the first length is different from the second length. The two different bend portions 2331, 2332 of the pixel electrode 233 are part of a series of three or more bend portions of the pixel electrode 233 smoothly connected together. A pitch between any two adjacent troughs of the pixel electrode 233 varies along a direction defined by a length of the pixel electrode 233. In the illustrated embodiment, a pitch between two adjacent troughs of the pixel electrode 233 progressively increases along a first direction defined by the length of the pixel electrode 233. Similarly, a pitch between two adjacent crests of the pixel electrode 233 progressively increases along the first direction. Further, a distance between a pair of an adjacent trough and wave crest progressively increases along the first direction. In the driven state, even though the pixel electrodes 233 and the common electrodes 243 are not on the same layer, a driving electric field generated is substantially parallel to the first and second substrates 201, 202. The positive liquid crystal molecules 203 align parallel with the electric field.

The pixel and common electrodes 233, 243 have bends, but their bends are smooth. Therefore disclination of the liquid crystal molecules 203 does not occur, and the contrast ratio of the IPS LCD 20 is unimpaired. Furthermore, because the pixel and common electrodes 233, 243 have the wavy shape, the electric field generated by them is a smooth continuum of multiple domains, and the IPS LCD 20 provides equally fine visual performance at various different viewing angles.

Figure 4:
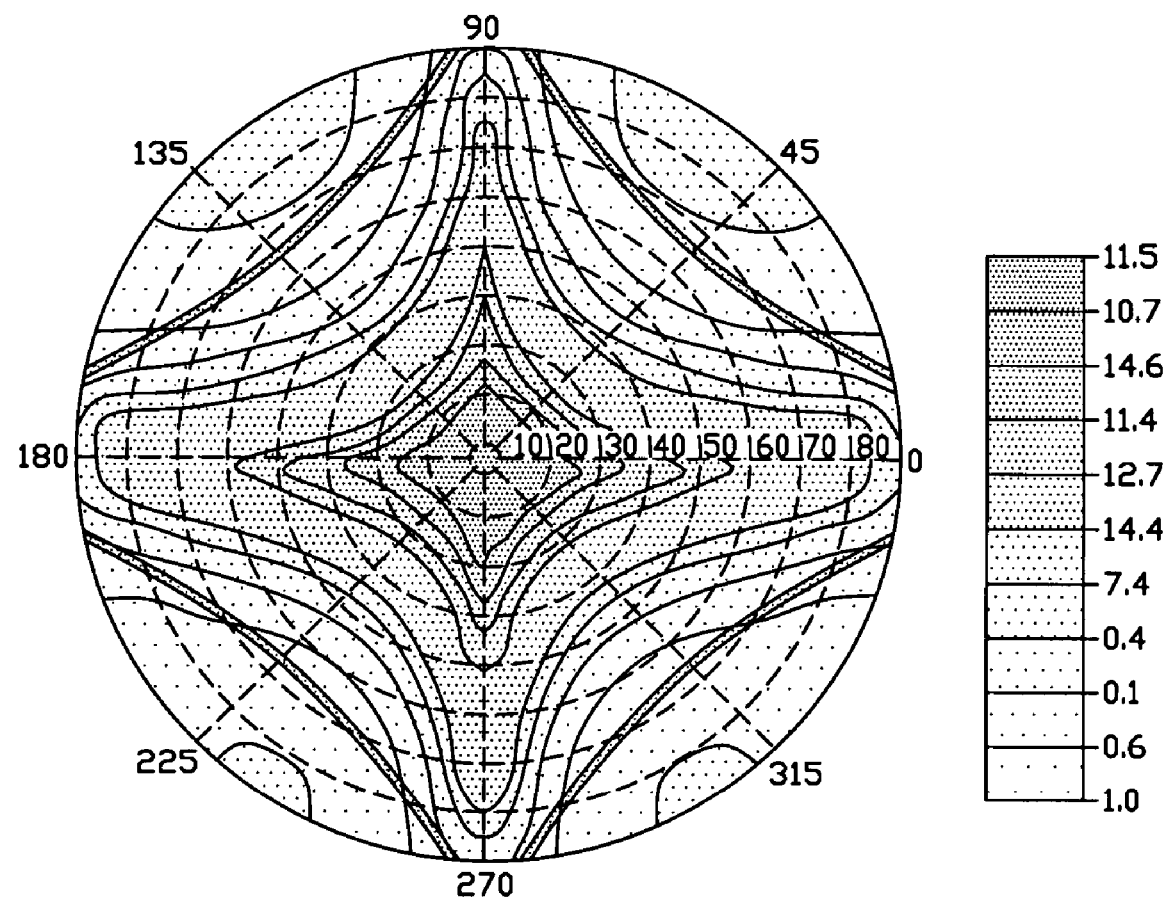
FIG. 4 is a graph showing the effect of viewing angle on contrast ratio of the IPS LCD of FIG. 1.
Figure 9:
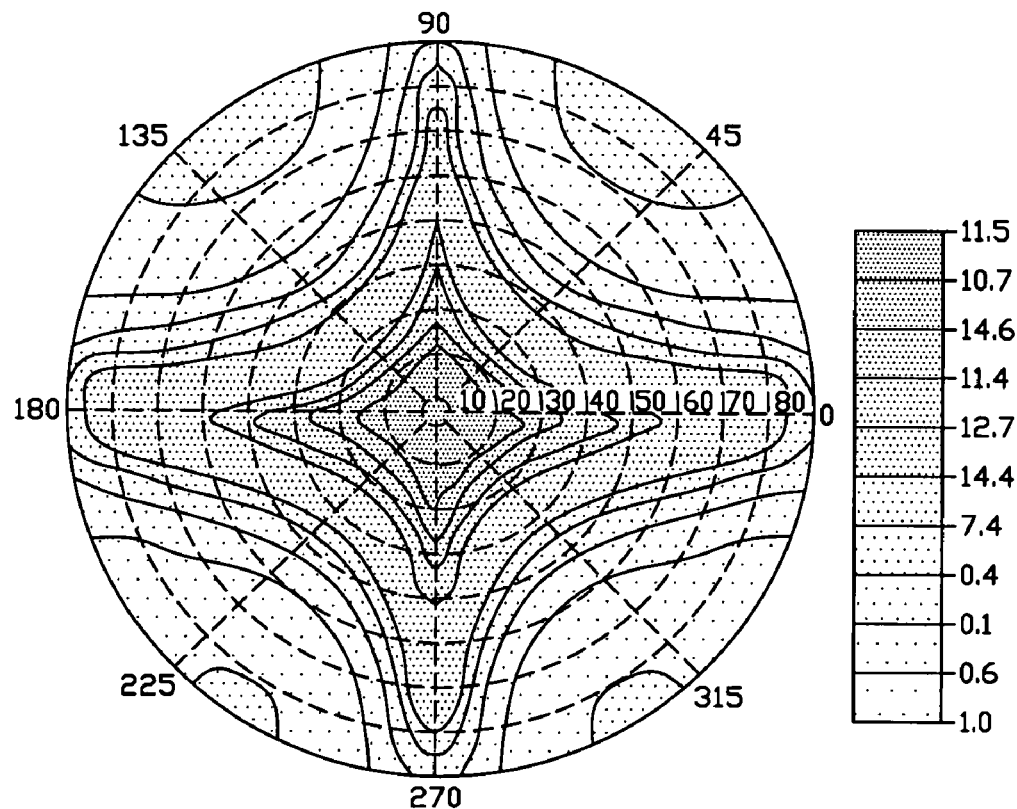
FIG. 9 is a graph showing the effect of viewing angle on contrast ratio of the IPS LCD of FIG. 6.

FIG. 4 shows the effect of viewing angle on contrast ratio of the IPS LCD 20. The data obtained is the result of the pixel and common electrodes 233, 243 both having the smooth wavy shape including the two different bend portions 2331, 2332, with the pixel and common electrodes 233, 243 being parallel to each other. That is, the pixel and common electrodes 233, 243 can be considered as an integrated continuum of progressively changing micro-electrodes, unlike conventional pixel and common electrodes that are oriented in two directions only. Therefore the electric field generated by the pixel and common electrodes 233, 243 is a smooth continuum of multiple domains, and the liquid crystal molecules 203 are aligned in the form of a smooth continuum of multiple domains. Because the alignment of the liquid crystal molecules 203 is a smooth continuum of multiple domains, the contrast ratio of the IPS LCD 20 is comparatively uniform, as shown in FIG. 4. Compared to the contrast ratio of the typical IPS LCD, as shown in FIG. 9, the contrast ratio of the IPS LCD 20 of the first embodiment at different viewing angles is improved.

In the first embodiment, the data lines 212 can also be wavy shaped. In particular, the data lines 212 can have two bend portions corresponding to the first and second bend portions 2331, 2332 of the pixel electrodes 233.

Furthermore, the IPS LCD 20 can have a color filter (not shown) disposed on either of the substrates 201 or 202. The color filter includes a plurality of pixels, and each pixel defines red (R), green (G), and blue (B) sub-pixels. Each sub-pixel has two bend portions corresponding to the first and second bend portions 2331, 2332 of the pixel electrodes 233.

Figure 5:
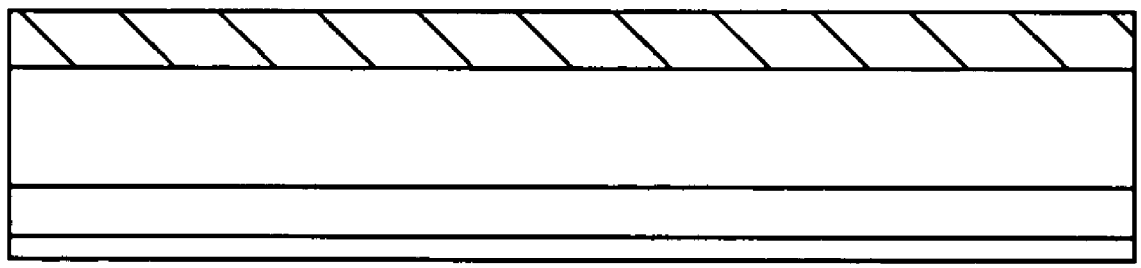
FIG. 5 is a schematic, side cross-sectional view of a pixel region of an IPS LCD according to a second embodiment of the present invention.
Figure 5:
Figure 5:
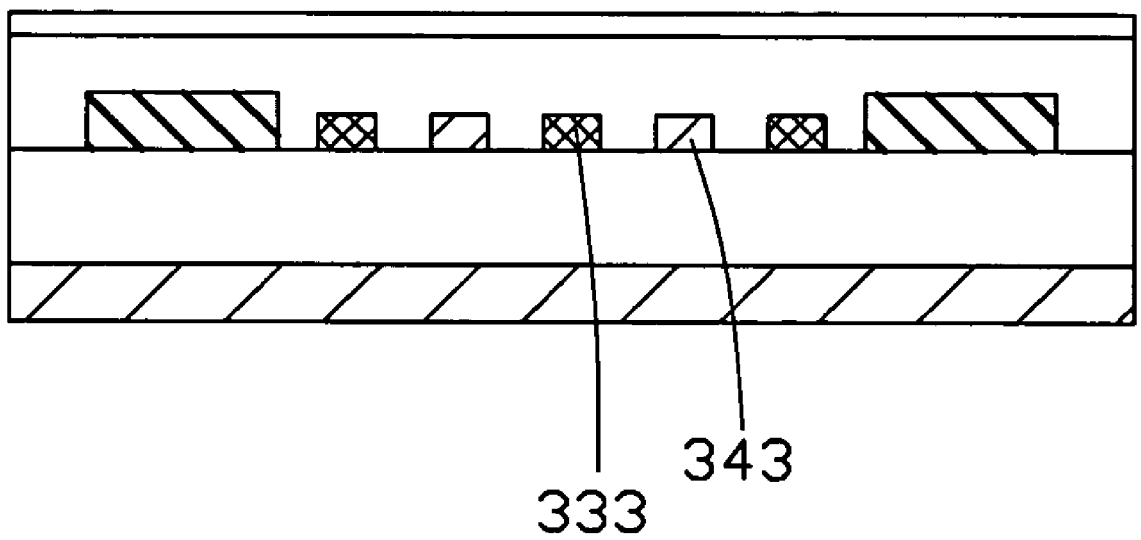
Figure 6:
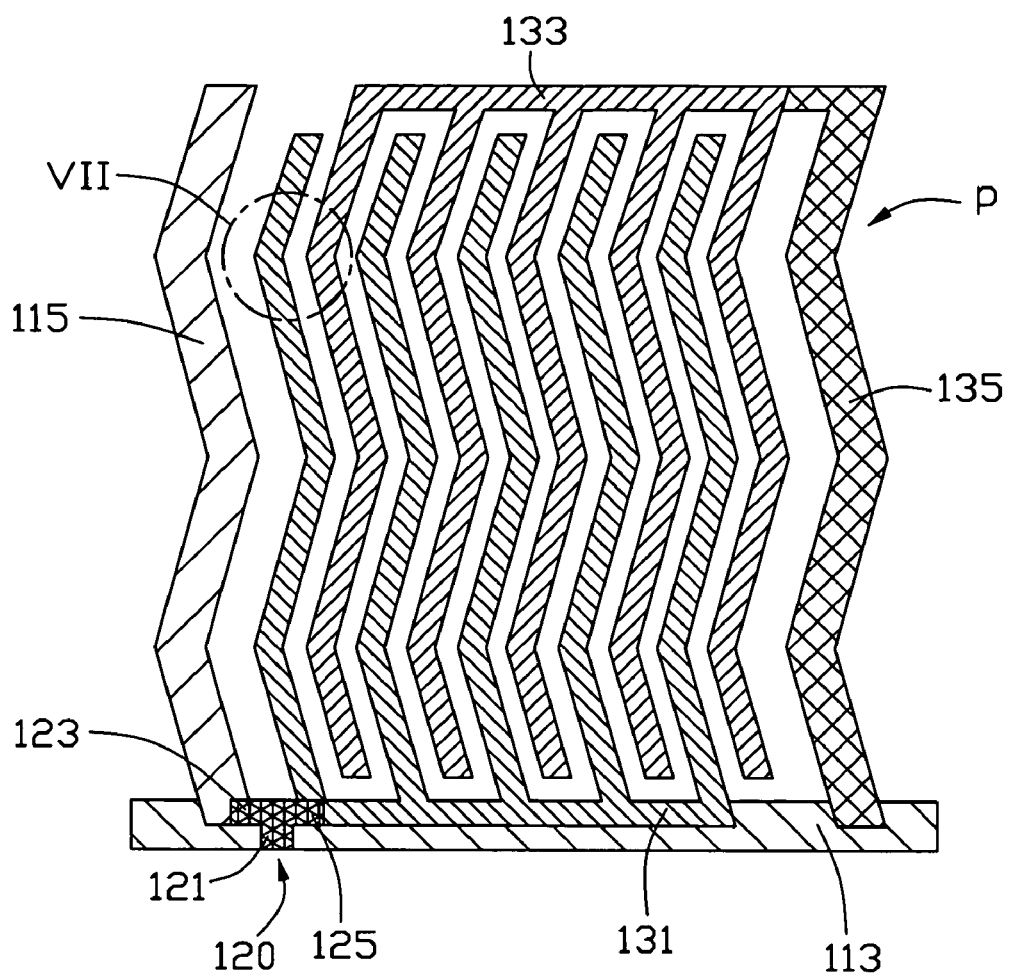
FIG. 6 is a top cross-sectional view of components of a pixel region of a conventional IPS LCD.
Figure 7:
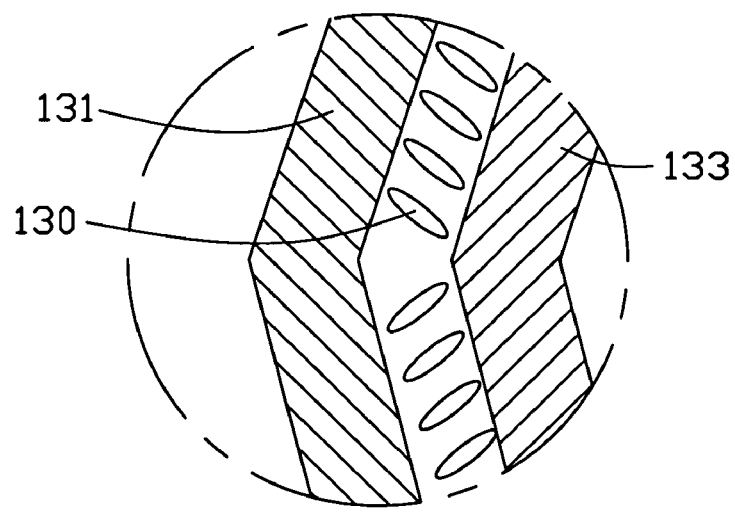
FIG. 7 is an enlarged view of a circled portion VII of FIG. 6.
Figure 8:
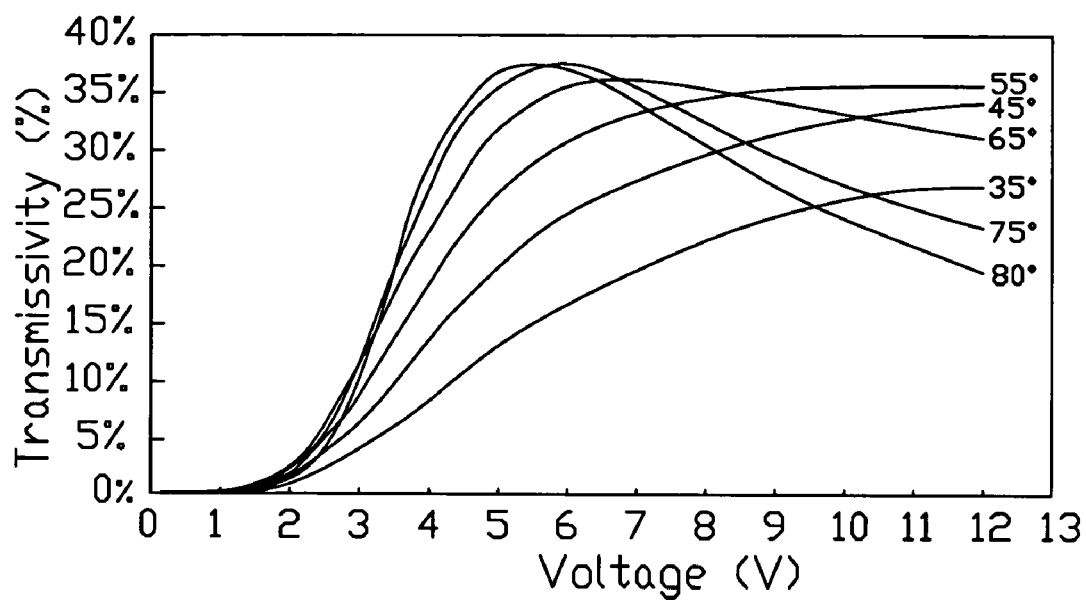
FIG. 8 is a graph of transmissivity versus voltage for the IPS LCD of FIG. 6, for different angles formed between a rubbing direction of liquid crystal molecules and directions defined by the pixel and common electrodes of the IPS LCD, the graph showing simulated results of the effect of driving voltage variations on a display of the IPS LCD.

Referring to FIG. 5, an IPS LCD of an alternative embodiment of the present invention is shown. The IPS LCD has a structure similar to that of the IPS LCD 20. However, common electrodes 343 and pixel electrodes 333 are formed on a same layer by utilizing contact holes or other suitable means. This can provide a symmetric electric field generated between the common electrodes 343 and the pixel electrodes 333, unlike the electric field generated between the common electrodes 243 and the pixel electrodes 233 formed on the different layers of the first substrate 201 of the IPS LCD 20. In other words, a true in-plane electric field can be generated, thereby achieving a higher efficiency of utilization of the electric field.

It is to be understood, however, that even though numerous characteristics and advantages of the various embodiments have been set forth in the foregoing description, together with details of the structures and functions of the embodiments, the disclosure is illustrative only, and changes may be made in detail, especially in matters of shape, size, equivalent material and arrangement of parts within the principles of the invention to the full extent indicated by the broad general meaning of the terms in which the appended claims are expressed.

The invention claimed is:

1. An IPS (in-plane switching) liquid crystal display, comprising:
   a first substrate:
   a second substrate;
   liquid crystal molecules interposed between the first and second substrates;
   a plurality of gate lines and data lines formed at the first substrate, thereby defining a plurality of pixel regions; and
   a pixel electrode, a common electrode and a TFT (thin film transistor) provided in each pixel region;
   wherein said pixel electrode and said common electrode have a same wavy shape with at least two different bend portions smoothly connected, and are uniformly spaced apart from each other, the wavy shape comprising at least one trough and at least one crest, a pitch between two adjacent troughs varying along a direction defined by a length of the pixel electrode and/or the common electrode.

2. The IPS liquid crystal display as claimed in claim 1, wherein the at least two bend portions define different radiuses.

3. The IPS liquid crystal display as claimed in claim 1, wherein the at least two bend portions have different lengths.

4. The IPS liquid crystal display as claimed in claim 1, wherein the common electrode and the pixel electrode are formed on different layers at the first substrate.

5. The IPS liquid crystal display as claimed in claim 1, wherein the common electrode and the pixel electrode are formed on a same layer at the first substrate.

6. An IPS (in-plane switching) liquid crystal display, comprising:
   a pixel matrix substrate comprising a plurality of pixel regions;
   wherein each pixel region comprises at least one pixel electrode and at least one common electrode, and an electric field generated by adjacent said pixel and common electrodes has a smooth continuum of multiple domains, said pixel electrode and said common electrode have a same wavy shape with at least two different bend portions smoothly connected, and are uniformly spaced apart from each other, the wavy shape comprising at least one trough and at least one crest, a pitch between two adjacent troughs varying along a direction defined by a length of the pixel electrode and/or the common electrode.

7. The IPS liquid crystal display as claimed in claim 6, wherein the two bend portions define different radiuses.

8. The IPS liquid crystal display as claimed in claim 6, wherein the two bend portions have different lengths.

9. The IPS liquid crystal display as claimed in claim 6, wherein the common electrode and the pixel electrode are formed on different layers of the substrate.

10. The IPS liquid crystal display as claimed in claim 6, wherein the common electrode and the pixel electrode are formed on a same layer of the substrate.

* * * * *